April 16, 1963 K. F. GRIFFITHS 3,085,873
METHOD FOR COLLECTING AND SEPARATING THE REFRACTORY METAL COMPONENT
FROM THE REACTION PRODUCTS IN THE PRODUCTION OF THE REFRACTORY
METALS TITANIUM, ZIRCONIUM, VANADIUM, HAFNIUM,
SILICON, THORIUM, CHROMIUM, OR COLUMBIUM
Filed Nov. 7, 1958 2 Sheets-Sheet 2

INVENTOR.
KENNETH FRANK GRIFFITHS
BY Norman N. Popper
ATTORNEY

United States Patent Office 3,085,873
Patented Apr. 16, 1963

3,085,873
METHOD FOR COLLECTING AND SEPARATING THE REFRACTORY METAL COMPONENT FROM THE REACTION PRODUCTS IN THE PRODUCTION OF THE REFRACTORY METALS TITANIUM, ZIRCONIUM, VANADIUM, HAFNIUM, SILICON, THORIUM, CHROMIUM, OR COLUMBIUM
Kenneth Frank Griffiths, 47 Branch Brook Place, Newark, N.J.
Filed Nov. 7, 1958, Ser. No. 772,493
6 Claims. (Cl. 75—84.1)

This invention relates to the method of collecting and separating reaction products in the production of the refractory metals titanium, zirconium, vanadium, hafnium, silicon, thorium, chromium and columbium and is a continuation in part of patent application 632,549, filed in the United States Patent Office on January 4, 1957, now abandoned, and of patent application 697,321, filed in the United States Patent Office on November 19, 1957, now abandoned, and of patent application 717,176, filed in the United States Patent Office on February 4, 1958, and of patent application 745,946, filed in the United States Patent Office on July 1, 1958.

Specifically my invention relates to the method of collecting and gravitationally separating metal product and reducing agent halide in the production of the refractory metals, titanium, zirconium, vanadium, hafnium, silicon, thorium, chromium and columbium, wherein the temperature of the collecting and separating reaction products is controlled by means of the deposition of a thin refractory metal sponge lining on the walls of the collection chamber which acts as a thermal barrier.

My present invention is useful in many types of reactions wherein the reaction products are produced and collected in the liquid phase and particularly useful in the liquid phase process for the production of the refractory metals titanium, zirconium, vanadium, hafnium, silicon, thorium, chromium and columbium in which the collecting reaction products are gravitationally separated while both are in the liquid phase. I have found that it is desirable to maintain the walls of the collection chamber near room temperature by means of some suitable circulating coolant since there is less tendency for the extremely hot molten reducing agent halide or molten metal product to stick to a wall the temperature of which is substantially less than the temperature of the collecting liquids. Moreover, a cool wall is less subject to corrosion. However, I have found that continuous, gravitational separation of the molten reducing agent halide from molten metal product is not feasible when carried out in a simple, cold walled vessel with unprotected walls. This is so because the excessive heat loss through exposed and drastically cooled walls causes the entire mass to solidify before the gravitational separation is complete. Thus, my present invention is, broadly, to permit continuous, gravitational separation of two, immiscible, extremely hot fluids in a cold-walled vessel by depositing on the walls a thin self-repairing lining of heat insulating material.

Therefore, it is among the objects and advantages of my invention to provide a method for collecting two immiscible, molten, extremely hot fluids in a cold wall vessel wherein the thermal flux across the walls is decreased by a thin self-repairing lining of insulating material deposited therein either from the collecting fluids or placed thereon before the process is begun.

Another object of my invention is to substantially reduce heat loss from molten fluids collecting in a cold-walled vessel.

Yet another object of my invention, is to permit a higher input flow rate of extremely hot, fluid reaction products into a cold-walled collection vessel for the purpose of conducting a continuous gravitational separation.

An additional object of my invention is to facilitate the continuous gravitational separation of extremely hot reaction products so as to prevent contamination by unwanted impurities.

These objects and advantages as well as other objects and advantages may be achieved by my process in which a thin heat insulating lining of one of the collecting products is deposited on the drastically cooled walls of the collection vessels or chambers either prior to the start of the run or during the course of the run. This process has particular use in the liquid phase process for producing the refractory metals titanium, hafnium, silicon, thorium, chromium, and columbium wherein the reaction products are collected and gravitationally separated in the liquid phase in a vessel whose walls are drastically cooled. In this process, the thin, heat insulating layer is comprised of solid metal product in any suitable form such as sponge or metal sheet. I have found that if proper conditions are maintained, this heat insulating lining of metal product is both self-forming and self-repairing.

*Production of Reaction Products*

In the liquid phase process, metal product halide is reacted continuously with a stream of reducing agent in a reaction chamber under the following general conditions.

(1) The temperature, pressure and the net heat balance within the reaction chamber system are such as to create and maintain steady state conditions under which the reaction products appear in the liquid phase and form and maintain a two-component flowing film of liquid reducing agent halide overlying liquid metal product on the surface of a solid metal product lining lightly adhering to the walls of the reaction chamber.

(2) The pressure of the reaction chamber is equal to or slightly greater than the effective vapor pressure of the reducing agent halide at the temperature existing at or in the vicinity of the two-component flowing film of molten reaction products flowing on the frozen metal product lining.

(3) The walls of the reaction chamber under the metal product lining are maintained substantially below the melting point of the metal product.

(4) Liquid metal product forms within the reaction flame and impinges on the two-component liquid flowing film; whereas, some of the reducing agent halide forms in the liquid phase within the reaction flame and some forms in the gas phase and thereafter condenses on the two-component flowing film.

(5) The liquid reaction products which collect on the solid metal product lining adhering to the walls of the reaction chamber, separate into two, distinct liquid flowing films, one of pure liquid metal product overlying the solid metal product lining and the other of liquid reducing agent halide overlying the liquid metal product film.

(6) The temperature, pressure and the net heat balance for the reaction chamber system are so controlled that the reaction products leave the reaction chamber in the liquid phase and that the metal product lining does not increase to a thickness sufficient to block the exit of the reaction chamber.

My process may be carried out in an apparatus which comprises generally a reaction chamber or burner which is provided with means for introducing fluidized reactants into its upper portion in such a manner as to produce a flame type reaction within the burner. Underlying the reaction chamber is a collection chamber into which molten reaction products fall. The walls of both the reaction chamber and the collection chamber are provided with jackets or passages through which a suitable coolant may be circulated. The reaction chamber walls are usually fabricated of copper, nickel plated copper or some other material with a high coefficient of thermal conductivity. The walls of the collection chamber may also be formed of copper, nickel, nickel plated copper or any other material which need not be particularly heat resistant but which has a high coefficient of thermal conductivity.

Although the shape of the reaction chamber and the collection chamber is not critical to my invention, as a practical matter, I prefer that the reaction chamber be cylindrical with its long axis vertical and with a high length to diameter ratio. The reaction chamber is closed at the top and open at the bottom to discharge reaction produtcs into the collection chamber below. I have found that water is a suitable coolant as is liquid sodium-potassium alloy.

The interior walls of the reaction chamber are lined with solid metal product or metal product sponge of a variable composition. This lining may be built up by the freezing of reaction products, principally metal product, on the walls as the reaction proceeds, or may be placed there before the reaction starts. The control of the steady state thickness of the lining and its initial creation will be more fully described later.

Choice of Reactants

A combination of a reducing agent and a metal product halide must be chosen which will react to form a reducing agent halide whose critical temperature is higher than the melting point of the metal product, otherwise, it would be impossible to produce both the reaction products in the liquid phase. It is preferable to choose a combination which will be productive of a reducing agent halide which has the lowest possible vapor pressure at the melting point of the metal product so that the process may be carried out at the lowest possible pressure. Moreover, it is desirable that the reducing agent halide have a vapor pressure substantially below the vapor pressure of the reducing agent in order that condensation of the reducing agent within the reaction zone may be minimized. In general, the reactants should have the following characteristics:

Reducing Agents Suitable to Produce the Desired Metal Product (1) Low melting point to facilitate its introduction into the reaction chamber at a controlled flow rate.

(2) High vapor pressure to minimize the amount of reducing agent that will dissolve in the molten metal product formed in the reaction flame zone.

(3) Be productive of halides with a low vapor pressure at the melting point of the metal product to minimize the necessary reaction pressure.

(4) Be productive of halides which are stable at the high temperature employed in the reaction zone in order that the reaction may go to completion with the reducing agent halide being condensed with the metal product.

(5) Have a low equivalent weight to minimize the weight necessary to produce a given weight of metal product.

(6) Have a generally low cost.

Metal Product Halide (1) Should be able to exist in either the liquid or gas phase at the lowest possible temperature so as to facilitate its introduction into the reaction chamber at a controlled rate.

(2) Should form a reducing agent halide with the lowest possible vapor pressure at the melting point of the metal product to minimize the necessary reaction pressure. In this respect, generally, the lower the atomic weight of the halogen the better.

With these factors in mind, any metal product halide is suitable which will be productive of a reducing agent halide whose critical temperature is higher than the melting point of the metal product.

Reducing Agent Halides Suitable for the Precipitation of a Metal Product Sponge Lining In general the reducing agent halide should have the following characteristics to be suitable for the precipitation of a metal product sponge lining.

(1) It must be a halide of a metal chosen from the group consisting of lithium, sodium, potassium, rubidium, cesium, magnesium, and calcium.

(2) It must have a critical temperature higher than the melting point of the desired metal product.

(3) It must be capable of existing in the liquid phase with the desired liquid metal product.

(4) It must be capable of dissolving some of the desired metal product at a temperature below the melting point of the metal product.

(5) It must be capable of dissolving increasing amounts of the desired metal product as its temperature increases through at least a portion of the range of temperatures between the melting point of the reducing agent halide and the melting point of the metal product.

It should be noted that if the metal product lining is to be placed on the collection chamber walls prior to the beginning of the process, the reducing agent need only have the characteristics enumerated in paragraphs (1), (2), and (3) above.

With these factors in mind, I find that sodium chloride is the reducing agent halide most often produced in the production of titanium, vanadium, zirconium, hafnium, thorium, silicon and chromium. Magnesium fluoride is the most desirable reducing agent halide for the production of columbium.

Mechanism of the Reaction

The actual mechanism of the reaction is highly complex and requires a thorough examination. At the outset, I must say that many of the observations respecting the kinetics of the reaction are based on theory, theoretical calculations and general conclusions drawn from observations of a test reactor and data obtained therefrom.

If the reaction is carried out in an elongated cylindrical reaction chamber closed at the top and open at the bottom, it is convenient for descriptive purposes to delineate the following three zones.

Zone 1 extends from the top of the reaction chamber to the region adjacent to the end of the input spray nozzle. In this zone, there is a protective layer of gas, preferably one of the inert gases, which inhibits the deposition of solid reaction products on the reactant spray nozzle orifices which would block them. Thus, it is necessary only that the protective gas layer surround the orifices sufficiently to prevent blockage, but it may extend to the top of the reaction chamber in some instances.

Zone 2 lies immediately below zone 1 and may be called the reaction flame zone. The principal part of the reaction occurs in zone 2 in a turbulent flame-type reaction. The metal product halide in either the gaseous, liquid or fluidized solid form may be introduced through the input nozzle. If introduced in either the liquid or fluidized solid form, this reactant may flash almost instantly to the gas phase due to the exothermic heat of reaction. The reducing agent is preferably introduced in the liquid phase through one of the orifices in the input nozzle. As the reactants come in contact with one another, a spontaneous flame-type reaction occurs. The exact mechanism of the flame is complex. The possibility exists that most of the reaction might occur along the exposed surface of the two-component liquid film which would act as a flame-holder. On the other hand, it is possible that the reaction would occur within the flame itself either as small droplets of reducing agent burning in an atmosphere of metal product halide or vice versa depending upon which reactant was the more volatile. Descending through zone 2, the concentration of reducing agent halide gas increases. Of course, throughout zone 2, there would be found highly variable partial pressures of each reactant, reaction product and stable intermediate halide. It should be noted that all substances leaving zone 2 must have a temperature at least as high as the melting point of the metal product. Also, the quantity of inert gas in the reaction flame should be held to a minimum to prevent dilution. Such dilution makes it more difficult to condense reducing agent halide in the reaction chamber. Although the metal product formed in zone 2 frequently includes excessive amounts of dissolved reducing agent, such can be removed by a further reaction in the condensation zone below.

Zone 3, the condensation zone, lies immediately below zone 2. Here, most of the reducing agent halide gas condenses on the exposed surface of the two-component flowing film. As the reducing agent halide condenses, it may bring down some unreacted gaseous reactants and intermediate reaction products. These in turn react to form additional liquid metal product and liquid reducing agent halide. In addition to this reaction which occurs upon condensation, the molten metal product may be purified of reducing agent solute by a true liquid phase reaction. This is an extraction type reaction between reducing agent solute in a metal product solvent and metal product halide solute in a reducing agent halide solvent. The purity of the metal product flowing from zone 3 improves as the ratio of reducing agent solute to metal product halide solute in zone 3 decreases. In addition to the condensation of reducing agent halide gas, molten metal product and molten reducing agent halide formed in zone 2 impinge and collect on the two-component film in zone 3 as well as in zone 2.

The Metal Product Lining and the Liquid Phase Film Separation of the Reaction Products In order to protect the walls of the reaction chamber from thermal shock and stress as well as corrosion due to the molten reaction products flowing thereon, and to discourage any reaction from occurring at the relatively low temperature of the chilled reaction chamber walls, such walls are lined with metal product of a suitable physical composition. This lining may be in the form of sponge, compressed sponge, sintered particles, compressed foil, solid plate, or any other suitable form. The lining may be placed on the walls of the reaction chamber before each run is started, or it may be built up upon the walls as the reaction proceeds in the following manner. As the reaction starts, the portion of the reaction which occurs immediately adjacent to the cold walls of the reaction chamber takes place at a temperature below the melting point of the metal product. Therefore, a lining of metal product sponge, which is mixed with other substances present in the reaction zone, builds in thickness upon the cold walls. As the lining thickens, its increasing thermal insulating ability allows its exposed surface to increase in temperature. As soon as the exposed surface of the lining reaches the melting point of the metal product, a steady state is achieved in which newly formed metal product and reducing agent halide impinging upon the lining remain in a two-component liquid film which flows down the solid lining. As the molten reaction products flow over the lining, they separate into two immiscible films, the lowermost being of molten metal product and the uppermost being of molten reducing agent halide, thus effecting what I call a "liquid-phase-film-separation."

Whenever the reaction chamber is in operation, the metal product lining tends to achieve an equilibrium thickness which may be controlled by any one or a combination of four factors: The pressure of the reaction chamber, the temperature of the reactants entering the reaction chamber, the flow rate of the reactants entering the reaction chamber and the temperature of the reaction chamber walls behind the lining. I have discovered that the equilibrium thickness of the lining may be decreased by increasing the condensation temperature of the reducing agent halide upon the exposed surface of the two-component film. This condensation temperature may be increased by increasing any one or a combination of three factors: the pressure of the reaction chamber, the temperature of the reactants entering the reaction chamber and the flow rate of the reactants into the reaction chamber. In addition, I have found that the equilibrium thickness of the lining may be diminished by increasing the temperature at which the reaction chamber walls are maintained. When the reaction chamber is to be operated under steady state conditions, a combination of reaction chamber wall temperature and condensation temperature of the reducing agent halide in the reaction chamber must be selected which permits a low enough equilibrium thickness for the metal product lining to prevent blocking the flow of reaction products from the reaction chamber.

Pressure of the Reaction Chamber

The pressure of the reaction chamber is most critical to my present invention. Since I have postulated a liquid phase reaction, the pressure must be maintaind sufficiently high to permit the reducing agent halide gas to condense at a temperature higher than the melting point of the metal product. On an ideal basis, if the gas in the reaction flame zone and condensation zone were comprised of 100% reducing agent halide and the reducing agent halide condensate were 100% pure reducing agent halide, the lowest allowable pressure would be equal to the vapor pressure of the reducing agent halide at the melting point of the metal product. However, experience has demonstrated that various other substances such as reducing agent and metal product halide present in the reaction chamber atmosphere and dissolved in the reducing agent halide condensate might either raise or lower the effective vapor pressure of the impure reducing halide by-product. For this reason, the actual allowable minimum reaction pressure may be somewhat higher or lower than the vapor pressure of the pure reducing agent halide at the melting point of the metal product. Therefore, for clarity, I shall designate the condensation vapor pressure of the impure reducing agent halide gas and condensate as the "effective vapor pressure of the impure reducing agent halide formed by the reaction." Under such a definition, the lowest allowable pressure is the effective vapor pressure of the impure reducing agent halide formed in the reaction at the melting point of the metal product.

As has been mentioned before, the net heat balance of the reaction chamber system must be such as to permit the equilibrium thickness of the metal product lining to be thin enough to prevent blocking the exit of the reaction chamber. Therefore, as a practical matter, in order to maintain a desirable equilibrium thickness of the lining, the reaction chamber pressure is set such that the condensation temperature of the impure reducing agent halide is somewhat above the melting point of the metal product.

The pressure in the reaction chamber may be controlled by the pressure of the gas in the collection chamber to which it is attached. The pressure in the collection chamber in turn may be controlled by any one of a number of standard pressure control systems for closed chambers.

Reaction Zone Temperature

Since my invention postulates producing the metal product in the liquid phase, it is necessary to maintain the reaction temperature above the melting point of the metal product. Such a temperature may be maintained by providing conditions such that the partial pressure of the impure reducing agent halide within the reaction zone is maintained at least high enough to permit it to condense at the melting point of the metal product. Such a partial pressure may be maintained by the proper control of the input temperature of the reactants to the reaction zone, the flow rate of each reactant to the reaction zone, and the control of the reaction chamber pressure. When at least some of the reducing agent halide is being produced in the liquid phase in the reaction flame zone, the temperature of the reaction flame is equal to the temperature at which the impure reducing agent halide gas is in equilibrium with the impure liquid reducing agent halide condensate.

In some cases, it may be that all the reducing agent halide is produced in gas phase in the reaction flame. In such a situation, the temperature of the flame is at least as high as and usually higher than the condensation temperature of the impure reducing agent halide at the existing pressure. However, the temperature drops sufficiently in the condensation zone adjacent to the molten reaction product film to permit the impure reducing agent halide gas to condense in the reaction chamber.

As a practical matter, the minimum allowable condensation temperature depends upon such variables as the temperature drop maintained across the metal product lining, the thermal conductivity of the lining, the diameter of the reaction chamber, the best transmission ability of the molten reaction product film, and the melting point of the metal product. When a reaction chamber of large diameter is employed with a small temperature drop across the lining and a low thermal conductivity of the lining, a condensation temperature very close to the melting point of the metal product may be employed without danger of the reaction chamber becoming blocked.

*Input Ratio of Reactants*

The optimum input ratio of reactants varies according to the specific combination chosen. A large preponderance of reducing agent would yield a larger percentage of metal product halide reduced to metal product but may leave the metal product contaminated with reducing agent solute. Conversely, the greater the preponderance of metal product halide, the less reducing agent contamination there would be, but the lower would be the yield of metal product. Therefore, these two factors must be considered simultaneously when choosing the molar input flow rate ratio of reactants. I have found that a nearly stoichiometric ratio is satisfactory in most cases, giving a yield of better than 90% reduction of the metal product halide to metal product with little reducing agent contamination in the metal product.

*Final Form of the Metal Product*

If shot is the desired final form of the metal product, the individual molten metal product drops falling from the reaction chamber exit into the collection chamber are frozen into discreet solid particles before they come into contact with one another at the bottom of the collection chamber. This may be accomplished by allowing the molten metal product drops to fall into and settle through a pool of molten reducing agent halide. The temperature of the pool of reducing agent halide is substantially below the melting point of the metal product with the result that the metal product drops freeze as they sink to the bottom of the pool. An alternative procedure would be to allow the drops of molten metal product to fall through an atmosphere of inert gas in the collection chamber such that the drops would freeze before striking the bottom.

If it is desirable to produce a metal product ingot instead of shot, both the metal product and the reducing agent halide are cooled together in a chilled ingot mold and are allowed to separate gravitationally while in a liquid phase. The reducing agent halide floats on top of the molten metal product and may be continuously decanted over the rim of the ingot mold. The metal product freezes in the ingot mold to form an ingot.

The metal product ingot thus being formed may be withdrawn downwardly with respect to the rim of the ingot mold at such a rate that none of the molten metal product, which is collected in the metal product pool, decants over the rim with the reducing agent halide.

The rim of the ingot mold is drastically cooled by a suitable coolant circulating within internal passages within it, and the lower portions of the ingot mold walls must be maintained at a low enough temperature to prevent the metal product from forming a highly adhesive bond with the walls. Of course, if the solid metal product ingot is continuously withdrawn downwardly, it is desirable that the ingot mold be of uniform cross-sectional configuration.

*Discharge of Reaction Products From the Reaction Chamber*

As the molten metal product flows from the exit of the reaction chamber, stalactites of solid metal product, which may resemble a curtain, may form and depend from the mouth of the opening between the reaction chamber and the collection chamber. If the growth of such formations were not checked, they would ultimately block the exit. Generally, such stalactites may be limited in growth by the application of heat. One method of supplying heat to the lowest portion of the stalactites is to maintain the top surface of the pool of collecting reducing agent halide thereunder at a temperature above the melting point of the metal product by aid of hot reaction products coming from the reaction chamber, and by maintaining the level of the pool just below the reaction chamber exit. An additional method of supplying heat to limit the growth of stalactites is to maintain a heat balance in the reaction chamber such that sufficient reducing agent halide gas leaves the exit of the reaction chamber to enable reducing agent halide gas to condense upon the stalactites at a higher temperature than the melting point of the metal product.

The growth of metal product stalactites can also be limited by maintaining the pool of collecting reducing agent halide below the stalactites at a different electrical potential than the stalactites. When the stalactites reach the pool, an electrical current flows between the stalactites and the pool, generating sufficient heat to prevent their further lengthening.

The growth of metal product stalactites may also be limited by direct heating of the stalactites and the molten metal product film thereupon by electrical induction. The induction coils should be spaced in such a position relative to the stalactites that no metal product would touch the coils.

The growth of the metal product stalactites may also be limited by means of heat radiated to them from a suitable radiator or heat reflector placed around the stalactites. The radiator is placed with respect to the stalactities and to the molten reaction products flowing off the lower end of the stalactites in such a manner that no liquid reaction products contact the radiator. The radiator may be heated by electrical induction, direct electrical resistance or even by condensing reducing agent halide. In most cases, the radiator is fabricated of metal product, but, on occasion, may be of tungsten, molybdenum or graphite. The temperature of the radiator may be any temperature which is sufficient to aid the heat of reaction in limiting the growth of the stalactites.

*Final Form of Reaction Products*

The metal product may be produced in the form of shot, an ingot, or a cast shape. In my present invention, I concern myself to the methods for collecting the liquid metal product and either gravitationally separating it into two liquid phases and then freezing it into an ingot or permitting liquid metal product to fall through liquid reducing agent halide to freeze into discrete metal product shot.

In the case where shot is the desired final form of the metal product, liquid metal product drops fall through liquid reducing agent halide collecting in a collection chamber which is cooled by some suitable coolant circulating in its walls. The metal product drops freeze as they descend to form discrete metal product shot. The reducing agent halide also freezes but from the bottom upwardly causing the solid metal product shot to collect in a core near the center of the frozen cake of reducing agent halide.

If it is desirable to produce an ingot, broadly, the metal product and the reducing agent halide are collected together in a chilled ingot mold and are allowed to separate gravitationally while in the liquid phase. The reducing agent halide floats on top of the molten metal product and may be continuously decanted over the rim of the ingot mold. The metal product freezes in the ingot mold to form an ingot. The metal product ingot thus being formed may be withdrawn downwardly with respect to the rim of the ingot mold at such a rate that none of the molten metal product, which is collected in the metal product pool, decants over the rim with the reducing agent halide.

The rim of the ingot mold is drastically cooled by a suitable coolant circulating within internal passages within it, and the lower portions of the ingot mold walls must be maintained at a low enough temperature to prevent the metal product from forming a highly adhesive bond with the walls. Of course, if the solid metal product ingot is continuously withdrawn downwardly, it is desirable that the ingot mold be of uniform cross-sectional configuration.

However, I have found that the use of a simple, cold walled vessel as a collection chamber or ingot mold presents certain problems. When the input mass rate of the reaction products flowing from the reaction chamber is great, an exceptionally high thermal flux is generated through the cold walls of the ingot mold. The result is that the heat loss of the mass is so great that the entire mass freezes before the metal product has had an opportunity to gravitationally separate. Moreover, the molten reaction products are corrosive to the walls of the ingot mold and collection chamber if there is direct contact.

I have found that these problems may be solved by the expedient of a thin lining of metal product on the walls of the ingot mold. Such a lining acts as a heat insulator to reduce substantially the thermal flux through the walls and to prevent direct contact between the walls and the molten reaction products. Such a lining may be built up on the walls of the ingot mold as the process proceeds or may be placed there before the run is begun.

*Creation of the Heat Insulating Metal Product Lining*

When molten metal product and reducing agent halide are produced by the methods described above, the molten reducing agent halide discharged from the reaction chamber is saturated with metal product solute. This is so even in cases where the metal product is principally frozen in the reaction chamber and only reducing agent halide is discharged into the collection chamber.

It should be noted that the "solution of reducing agent halide saturated with metal product" may actually be a solution comprised of reducing agent solute and metal product halide solute in equilibrium with metal product precipitate in a solvent of reducing agent halide. Theoretically, the mechanics of the process may involve the driving to completion of the reaction between reducing agent solute and metal product halide solute in a reducing agent halide solvent to produce a metal product precipitate and more molten reducing agent halide. Such a reaction is reversible and can be driven to completion by lowering the temperature of the solution. The net result is the same as if a metal product solute were precipitated from a reducing agent halide solvent by chilling which in fact may actually account for the formation of a portion of the metal product lining.

This lining of metal product is instantly self-creating when a saturated solution of metal product solute in molten reducing agent halide solvent comes in contact with the drastically chilled walls of the ingot mold. In addition, this lining is self healing in the event it is ruptured. This process for protecting vessel walls is available to any system in which the solubility of the metal product in the solvent diminishes as the temperature of the solvent diminishes.

*Composition of the Metal Product Lining*

The lining is usually in the form of metal product sponge of a highly variable composition. In the production of titanium the metal product lining which precipitates from a sodium chloride solvent is comprised of a mixture of titanium crystals with the interstices between the crystals filled predominately with sodium chloride. Of course, it is possible to use the basic process for the production of metal product alloys by merely introducing one or more alloying elements, usually in the form of powder, into the reaction chamber. In such a case, the metallic sponge lining on the ingot mold walls would probably have a composition substantially different from that of the metal product alloy produced. This is so because the coefficient of solubility of the various alloying elements, in the reducing agent halide solvent, may be different than that of the metal product. In general, the more soluble the alloying element, the higher will be its percentage in the metallic sponge lining precipitated with respect to its percentage in the metal product alloy.

*Reaction Apparatus*

The foregoing procedures may be carried out in the apparatus illustrated in the drawings, in which.

Figure 1:
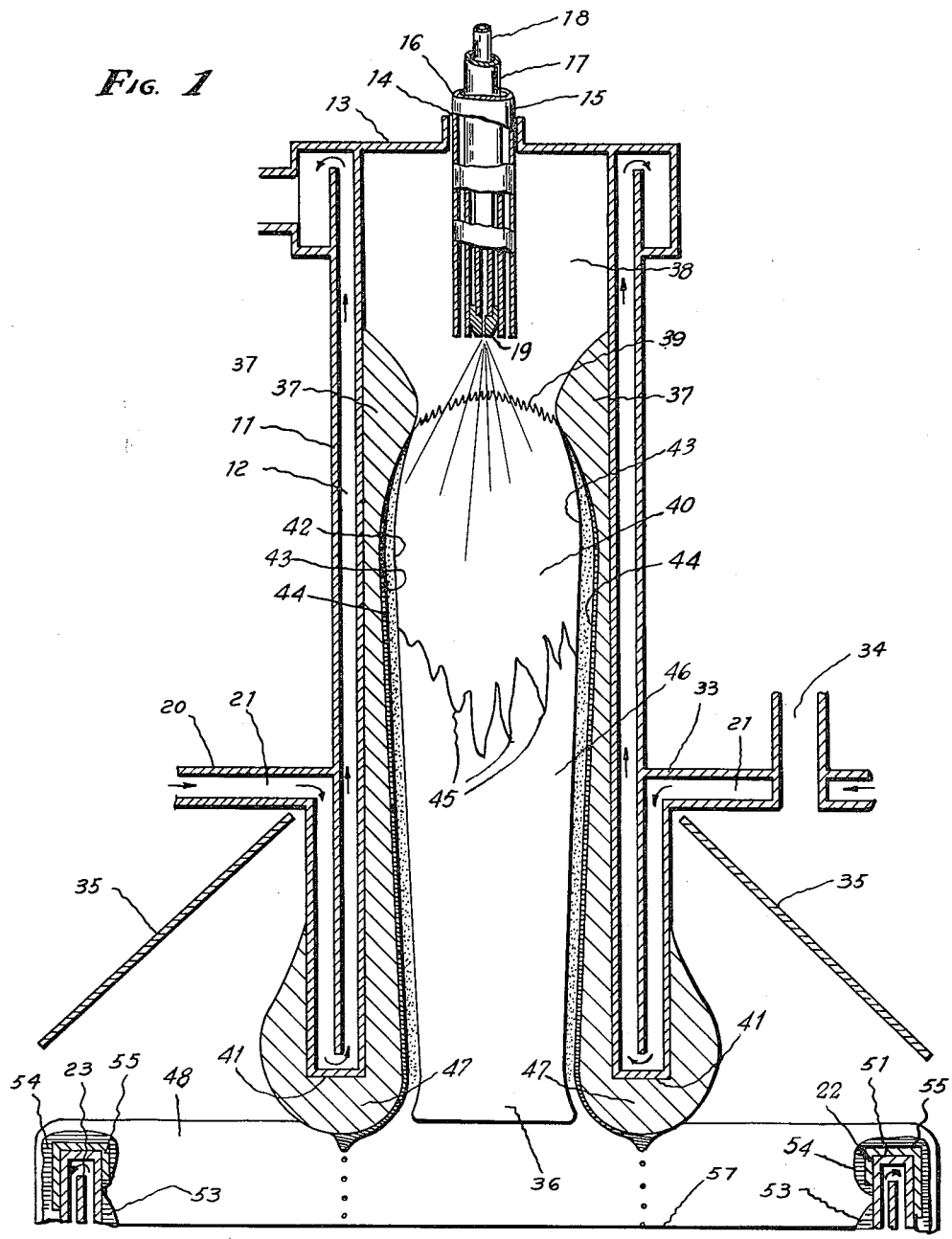
FIGURE 1 is a side, elevational, cross-sectional view showing the reaction chamber, part of the collection chamber and part of the ingot mold.

Referring now to the drawings in detail, my apparatus consists of an elongated, cylindrical reaction chamber 11, which is provided with an external jacket 12 through which flows a suitable coolant. The top 13 of the reaction chamber 11 is closed except for a circular opening 14 through which projects reactant input torch 15. The torch 15 is comprised of three concentric conduits, 16, 17 and 18. The annular space between conduits 16 and 17 is connected to a source of supply of either liquid or gaseous metal product halide. The annular space between conduits 17 and 18 is connected to a source of supply of inert gas. Conduit 18 is connected to a source of liquid or gaseous reducing agent. The lower end of conduit 18 is provided with a conical spray nozzle 19 which is so positioned as to spray the reducing agent down the central axis of the reaction chamber in a full conical spray. The metal product halide flows from the annular orifice defined by the ends of conduits 16 and 17 downwardly into the reducing agent spray emitting from the nozzle 19. A controlled flow rate of inert gas flows from the annular orifice defined by the space between the reducing agent spray nozzle 19 and the lower end of conduit 17. The presence of inert gas between the reducing agent nozzle 19 and the metal product halide orifice helps to prevent metal product sponge from forming on and blocking the orifice of the reducing agent nozzle 19. In the alternative, deposition of metal product sponge on the reducing agent nozzle orifice can be prevented by spraying the reducing agent out of it under a very high pressure.

A collection chamber 20 is provided below the reaction chamber 11. It is preferable that the collection chamber be cylindrical and coaxial with the reaction chamber but its particular shape is not critical to my invention.

The collection chamber 20 is provided with coolant jackets or passages 21 which connect to the coolant jacket 12 which surrounds the reaction chamber 11. Within the collection chamber 20 is an ingot mold 22 which is shown to be cylindrical although its shape is not critical to my invention. The ingot mold 22 is provided with coolant jackets or passages 23 within its walls. Within the ingot mold 22, there is a retractable piston 24 of substantially the same cross-sectional shape of the ingot mold 22. The piston 24 is connected to a piston rod 25 which may be raised or lowered by some suitable system not shown in the drawings. This piston rod 25 passes through an opening 26 in the bottom 27 of the collection chamber 20. The bottom 27 of the collection chamber 20 is formed integral with the ingot mold 22 and is provided with coolant passages 28 which connect with the coolant passages 23 in the walls of the ingot mold 22. The bottom 27 of the collection chamber 20 and the ingot mold 22 may be moved up and down with respect to the collection chamber by any suitable system not shown in the drawings. A gasket 29 seals the bottom 28 of the collection chamber to the walls thereof.

The piston 24 within the ingot mold 22 is provided with holes 30 through which may be placed bolts 31 made of metal product. The ends of the bolts 31 are threaded and are provided with nuts 32. The opposite ends of the metal product bolts 32 extend through the piston 24 into that portion of the ingot mold 22 where molten metal product collects.

The top 33 of the collection chamber 20 is provided with a conduit 34 through which inert gas at a controlled pressure passes. A heat reflector 35 surrounds the exit 36 of the reaction chamber 11 which projects downwardly through the top of the collection chamber 20. This heat reflector 35 decreases the rate of heat loss from the area surrounding the exit 36 of the reaction chamber 11 and may be made of metal product.

The reaction chamber 11, collection chamber 20 and ingot mold may be fabricated of copper, nickel, nickel plated copper or any other strong, corrosion resistant material with a high coefficient of thermal conductivity.

In operation, liquid or gaseous metal product halide and reducing agent are passed at a controlled flow rate from the lower end of the torch 15. At the same time, a gentle, controlled flow of inert gas is emitted from the annular orifice defined by the ends of conduits 17 and 18. At the input temperature of the reactants, a spontaneous flame-type reaction occurs forming metal product and reducing agent halide. Since the reaction chamber 11 is drastically cooled, any reaction which occurs near its walls will take place at a temperature below the melting point of the metal product, thereby producing a metal product sponge which is mixed with a variable amount of reducing agent halide and other substances present in the reaction flame. This metal product sponge forms a lining 37 which lightly adheres to the walls of the reaction chamber 11.

The gentle flow of inert gas emitting from the torch 15 forms a protective layer of inert gas about the end of the torch 15. The inert gas may extend from the end of the torch 15 to the top 13 of the reaction chamber 11 to form a cover gas zone 38. Interface 39 represents the boundary between the cover gas zone 38 above and the reaction flame zone 40 below.

The drawings show the reaction after steady state conditions have been reached. The metal product sponge lining 37 covers the walls of the reaction chamber 11 as well as the rim 41 of the exit 36 of the reaction chamber 11. A two-component film 42 has formed over the metal product sponge lining 37. The film 42 is comprised of an overlying film of molten reducing agent halide 43 containing some suspended molten metal product mist, and an underlying film of molten metal product 44. Interface 45 represents the boundary between the reaction flame zone 40 above and the condensation zone 46 below. In the condensation zone 46, which is cooler than the reaction flame zone, a substantial amount of the reducing agent halide gas formed in the reaction flame zone 40 condenses on the exposed surface of the two-component film 42. As the reaction products flow downwardly in the film 42, the two, distinct immiscible films of metal product 44 and reducing agent halide 43 become more defined and pure. As has been previously mentioned, some reaction between reducing agent solute in the molten metal product and metal product halide solute in the reducing agent halide condensate may occur to remove undesirable reducing agent solute from the molten metal product before it leaves the reaction chamber 11.

As the molten metal product flows from the exit 36 of the reaction chamber, it may form a curtain 47 of stalactites which depends from the rim 41 of the exit 36 of the reaction chamber 11. The length of these stalactites may be controlled by any one of the methods previously described. In the drawings, I have shown a construction whereby the length of the stalactites 47 is limited by the presence of a pool 48 of molten reducing agent halide which lies in the ingot mold 22 immediately below the exit 36 of the reaction chamber 11. This pool 48 is also in contact with the metal product stalactite curtain 47. The temperature of the reducing agent halide pool 48 is higher than the melting point of the metal product and thereby limits the growth of the metal product curtain 47.

A metal product sponge lining covers the walls of the ingot mold 22 and the collection chamber 20. Metal product sponge lining 53 covers the interior walls and the floor of the ingot mold 22 and metal product sponge lining 54 covers the solid metal product rim 55 and exterior walls of the ingot mold 22 and the floor and the interior walls of the collection chamber 20.

In operation, the two-component molten flowing film 42 comprised of an underlying film 44 of metal product and an overlying film 43 of reducing agent halide discharge from the curtain of stalactites 47 into the ingot mold 22. The reaction product falls first into a pool 48 of molten reducing agent halide, the heavier molten metal product gravitationally separating into a lower pool 49 of metal product. However, the molten reducing agent halide pool 48 is saturated with metal product solute which, through the aforementioned process precipitates out on the interior walls of the ingot mold 22, to form a metal product sponge lining 53, as the temperature of the reducing agent halide falls. It should be noted that the rim 51 of the ingot mold 22 is provided with a compressed metal product sponge cap 55 prior to the start of the run to initially protect the ingot mold.

As the metal product separates from the reducing agent halide and solidifies into a solid ingot 50, the piston 24 is withdrawn downwardly. This downward movement is facilitated by the fact that the insulating layer of sponge metal product 53 only lightly adheres to the walls of the ingot mold 22. However, as the piston 24 is withdrawn downwardly, a portion of the interior walls of the ingot mold 22 become exposed at level 56 where the lining 53 breaks away from lining 54 which covers the cap 55 and the exterior walls of the ingot mold 22, and the interior walls of the collection chamber 20.

The input flow rate of reactants to the ingot mold, the temperature of the liquid reactants flowing into the ingot mold and the rate of heat loss from the liquid contents of the ingot mold should be maintained such that the temperature of the reducing agent halide pool 48 remains above the melting point of the metal product. This is done so that the drops of metal product flowing from the stalactites 47 depending from the lower end of the reaction chamber will gravitationally separate while in the liquid phase to ultimately form a solid ingot. If the temperature of the reducing agent halide pool were below the melting point of the metal product, the metal product drops would freeze to form shot before gravitationally separating.

As the reducing agent halide decants over the rim 51 of the mold 22 and fills the annular collection chamber 20, metal product precipitates from the saturated reducing agent halide solvent to form a layer of metal product sponge 54 on all exposed surfaces in the same manner as it forms inside of the ingot mold. The layer of precipitated metal product overlying the metal product cap 55 will reach an equilibrium thickness when its surface reaches the melting point of the metal product.

The heat balance at the top of the ingot mold may be such that the metal product lining 53 reaches the melting point of the metal product at some point above the surface 57 of the pool 49 of liquid metal product.

As the reaction proceeds, the decanted reducing agent halide in the annular collection chamber 20 solidifies from the bottom to the top to form a reducing agent halide cake 52. The surface of the cake is a pool of liquid reducing agent halide 59 which has not yet frozen. The lining 54 of metal product sponge protects the walls of the collection chamber 20 and the exterior walls of the ingot mold 22 from the hot reducing agent halide and acts also as an insulator to inhibit excessive thermal flux through those walls.

As a practical matter, I employ a helium atmosphere in the collection chamber 20 in order to force any reducing agent halide gas which may pass out of the reaction chamber 11 to lie close to the surface of the reducing agent halide pool 48. This inert gas is introduced through conduit 34 in the top of the collection chamber 20.

In order to describe my process more elaborately, I present the following example:

*Example 1.—Continuous Production of Molten Titanium and Molten Sodium/Chloride; and, Also, the Production of a Pure Titanium Ingot*

Figure 2:
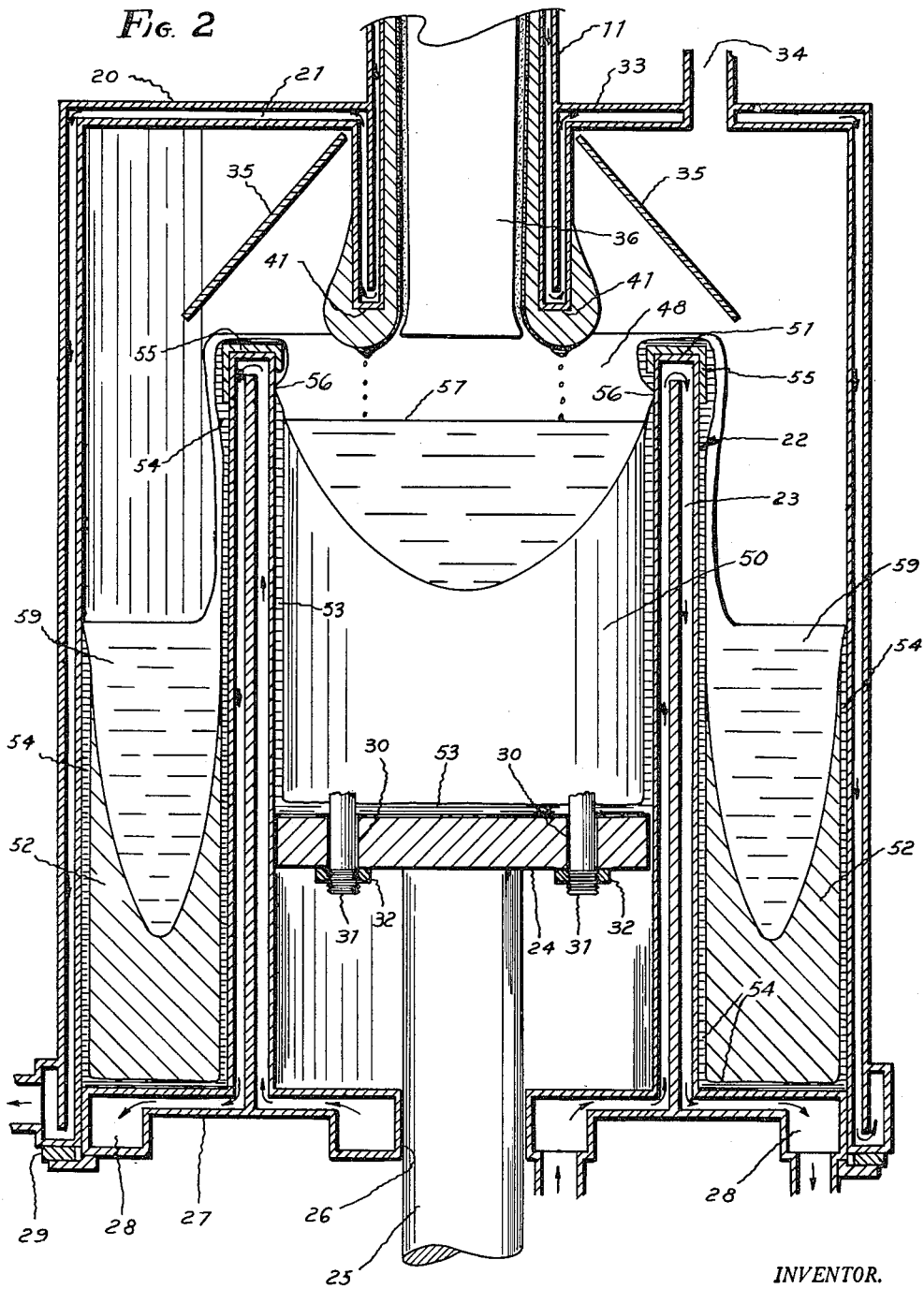
FIGURE 2 is a side, elevational, cross-sectional view showing the collection chamber, the ingot mold and part of the reaction chamber.

Apparatus similar to that shown in FIGURES 1 and 2 is provided. Also, two storage tanks are provided; one, heated, for liquid sodium and the other for liquid titanium tetrachloride. A duplex proportioning pump supplies a separate stream of each reactant from the respective storage tanks to the appropriate channel in the reactant input torch for the reaction chamber. The reaction chamber comprises a water cooled copper cylinder, approximately 12 inches in internal diameter and 30 feet high with its central axis vertical. The top of the reaction chamber is closed, but the bottom is open and connects with a water cooled, copper collection chamber which is a cylinder approximately 15 feet in internal diameter and 25 feet deep mounted with its central axis vertical and coincident with the vertical axis of the reaction chamber. The open bottom of the reaction chamber is one foot below the roof of the collection chamber. The lower end of the reactant input torch is approximately 4 feet below the roof of the reaction chamber and is positioned to spray the reactants in a conical spray down the central axis of the reaction chamber.

The ingot mold is fabricated of copper, is water cooled, has its rim on a horizontal plane approximately 6 inches below the bottom of the reaction chamber, has a rectangular cross-section of 17 by 61 inches and has its central axis coincident with the central axis of the collection chamber and the reaction chamber. The ingot mold sits upon and is attached to the center of the collection chamber bottom. The collection chamber bottom is detachable from the collection chamber side walls. When the collection chamber is to be opened, the collection chamber bottom and the entire ingot mold attached thereto can be lowered sufficiently to enable the contents of the collection chamber and the ingot mold to be removed easily. During each run, the collection chamber bottom is pressed hard against a suitable gasket located between it and the lower edge of the collection chamber side walls.

The ingot mold is provided with a retractable piston which can slide up or down through its bore. This retractable piston is fabricated of nickel plated copper and is cooled with water. The rim of the ingot mold over which the halide decants is covered with a lining of compressed titanium sponge ½ inch thick as are the interior walls of the mold itself. Vertical holes are provided in the retractable piston in order that titanium bolts can be passed through those holes as is shown in FIGURE 2. The retractable piston is provided with means for raising or lowering it at a controlled rate within the ingot mold.

In the top of the collection chamber, there is a conduit leading to a system which is capable of evacuating the collection chamber or maintaining a controlled pressure of helium in it.

Before the start of a run, the reaction chamber and collection chamber system are sealed air tight by reason of the collection chamber bottom being pressed against the sealing gasket, and the air in it is pumped out and replaced with helium at approximately 12 atmospheres pressure. Cold water is circulated through the walls of the reaction chamber, collection chamber and ingot mold. The retractable piston is positioned 4 inches below the rim of the ingot mold. The reactant proportioning pump is adjusted to deliver titanium terachloride and sodium to the reaction chamber as well as an alloy metal powder in sufficient quantities to produce 10,000 lbs. per hour of titanium alloy and 37,000 lbs. per hour of sodium chloride. The inert gas feed system is adjusted to deliver 0.005 mole per second of helium. Titanium bolts are inserted in the bolt holes of the retractable piston such that the upper ends of the bolts extend about 2 inches above the top surface of the retractable piston. The apparatus is now in condition to start a run.

A flame-type reaction is initiated spontaneously as soon as the reactants come in contact with each other. The sodium is introduced at approximately 150° C. in the form of a full conical spray directed down the central axis of the reaction chamber from a spray nozzle in the center of the tip of the reactant input torch. The 0.005 mole per second of helium is introduced from an annular orifice situated immediately around the sodium nozzle. The liquid titanium tetrachloride reactant is introduced at 150° C. from an annular orifice immediately surrounding the inert gas orifice. As a result, the titanium tetrachloride and the sodium mix thoroughly and react below the reactant input torch.

At the beginning of the reaction period, the portion of the reaction flame, which is immediately adjacent to the cold reaction chamber walls, takes place at a temperature below the melting point of titanium. Therefore, a lining of titanium sponge, which is mixed with sodium chloride, titanium dichloride and some sodium, builds in thickness upon the cold walls. As the lining thickens, its interface with the reaction flame increases in temperature. As soon as the exposed surface of the lining reaches the melting point of titanium, the lining ceases to increase further in thickness, and all the reaction products impinging upon it thereafter remain in liquid phase and flow down it in a two-component film. As the liquid titanium and liquid sodium chloride flow down the molten surface of the lining towards the reaction chamber exit, the aforementioned process of "liquid-phase-film-separation" causes substantially all the molten titanium to separate from the molten sodium chloride. The result is that almost all the molten titanium is consolidated in a flowing film of molten titanium before it is discharged from the reaction chamber.

Immediately after the titanium sponge lining has reached steady state thickness, molten reaction products flow from the exit of the reaction chamber into the ingot mold and collect on top of the retractable piston. Within a short period of time, reaction products begin to collect on top of the retractable piston in the ingot mold. A titanium sponge lining immediately begins to build on the interior walls of the ingot mold by the above-mentioned reaction which precipitates titanium sponge from the titanium saturated sodium chloride liquid. At the same time, the liquid titanium gravitationally separates to the lower regions immediately in contact with the retractable piston. The titanium sponge lining initially placed on the ingot mold walls protects them from excessive thermal shock and heat loss when the reaction begins. When the sodium chloride pool reaches such a depth that its upper surface reaches the spout on the rim of the ingot mold, sodium chloride decants into the collection chamber. Additionally titanium sponge now precipitates on the spout of the ingot mold as well as on its exterior walls and the interior walls of the collection chamber.

When the titanium pool on the retractable piston reaches a depth of approximately one inch, the retractable piston is withdrawn downwardly at a rate of approximately 0.96 inch per minute. Such a rate of descent will maintain the level of the collecting titanium pool about three inches below the spout of the ingot mold, so that sodium chloride will decant at the same rate as it is added to the ingot mold.

As the retractable piston is withdrawn downwardly, the titanium sponge lining slides downwardly also exposing a portion of the interior wall of the ingot mold below the rim. However, a new titanium sponge lining immediately, and continuosuly forms and thickens as it descends. At the level of the collecting titanium pool, the sponge lining has reached a thickness which is approximately directly proportional to the distance between the rupture level and the top of the molten titanium pool and inversely proportional to its rate of descent.

As the retractable piston descends, the molten titanium pool freezes from the bottom upwardly forming a continuous, ever elongating solid ingot. The sodium chloride which decants into the collection chamber freezes in a similar manner to form a continuous, ever elongating, annular cake.

Throughout the run, the temperature of the molten sodium chloride is maintained approximately 50° C. above the melting point of titanium.

The pressure within the reaction chamber and the collection chamber is maintained at approximately 12 atmospheres by means of the helium pressure control system.

A conical titanium heat reflector is provided over the ingot mold in the same general position as is shown in the drawings. Such a heat reflector tends to arrest heat loss from the molten products in the ingot mold.

As the reaction proceeds, the three zones of the reaction chamber as shown in FIGURE 1 become apparent. A helium atmosphere collects under the roof of the reaction chamber and extends downward to a level slightly below the reactant input torch, thereby defining the cover gas zone. Substantially no reaction takes place in this zone. The principal part of the reaction takes place in the reaction flame zone which extends from the level where the reactants mix to a point midway down the reaction chamber. In the uppermost portion of the reaction flame zone, liquid titanium tetrachloride is vaporizing, creating a localized atmosphere of titanium tetrachloride. The liquid sodium being sprayed from the reactant input torch burns in this localized atmosphere to produce titanium dichloride, titanium and sodium chloride. Lower down in the reaction flame zone, liquid sodium that escaped reaction in the upper portion vaporizes. As one progresses downwardly in the reaction flame zone, the partial pressure of sodium chloride gas increases to a maximum at the interface of the reaction flame zone and the condensation zone. All of the sodium chloride gas produced in the reaction chamber is produced in the reaction flame zone. The upper portion of the reaction flame zone is rich in titanium tetrachloride gas, the middle portion contains a turbulent and highly variable mixture of titanium tetrachloride gas, titanium dichloride gas, sodium gas and sodium chloride gas plus a trace of helium and other gases, and the lower portion is predominantly sodium chloride gas with some sodium gas and titanium dichloride gas.

In the condensation zone, which may extend from the bottom of the reaction flame zone to the bottom of the reaction chamber, most of the sodium chloride gas generated in the reaction flame zone condenses upon the two-component film of molten reaction products flowing down the exposed surface of the titanium sponge lining. The condensing sodium chloride brings down a considerable quantity of the sodium gas and the titanium dichloride gas within it. At the point where the sodium gas and the titanium dichloride gas are brought down, they react with each other and with titanium dichloride solute in the molten sodium chloride film to produce additional liquid titanium and liquid sodium chloride. The condensation zone is relatively non-turbulent in comparison to the reaction flame zone.

In the upper portion of the reaction chamber adjacent to the reaction flame zone, the molten titanium being formed in the reaction zone may contain a considerable concentration of gaseous sodium solute. Also, the liquid sodium chloride formed in the reaction flame zone may contain a considerable quantity of titanium dichloride solute. As the molten titanium and the molten sodium chloride flow down the titanium sponge lining to the exit of the reaction chamber, the sodium solute in the molten titanium may react with the titanium dichloride solute in the molten sodium chloride to form more liquid titanium and liquid sodium chloride. The net result of this liquid phase reaction is to remove substantially all the sodium solute from the molten titanium before it is discharged from the reaction chamber.

Thus, liquid titanium containing only a trace of dissolved sodium, and liquid sodium chloride, which is saturated with liquid titanium and contains some unreacted titanium dichloride, flows into the ingot mold. Also, some sodium chloride gas, which contains a considerable quantity of sodium gas and a lesser amount of titanium dichloride gas, flows into the collection chamber from the reaction chamber.

The exit of the reaction chamber is prevented from becoming blocked with frozen titanium by the flow of hot reaction products and sodium chloride gas through it. Also, heat is supplied to the titanium stalactite formation by reason of the sodium chloride pool, which is immediately beneath it, having a temperature higher than the melting point of titanium.

During a five hour run, a titanium ingot approximately 16 inches by 60 inches in cross-sectional area and 24 feet deep forms. At this point, the reaction is terminated by merely shutting off the flow of reactants to the reaction chamber. After a suitable cooling time, the frozen reaction products are removed from the ingot mold and the collection chamber. The removal of both the titanium ingot and the annular sodium chloride cake is facilitated by the lining of titanium sponge which covers both and which adheres only lightly to the walls of the respective vessels.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. The method of collecting and separating the refractory metal component from the reaction products formed during the reduction of a halide of a refractory metal chosen from the group consisting of titanium, zirconium, vanadium, hafnium, silicon, thorium, chromium and columbium with a reducing agent chosen from the group consisting of the alkali and alkaline earth metals comprising introducing into a vessel liquid metal product and liquid reducing agent halide containing a portion of said liquid metal product in solution, chilling the walls of the vessel, contacting the solution of liquid reducing agent halide having metal product dissolved therein to the chilled walls of the vessel, thereby producing and maintaining a metal product sponge lining on the chilled walls of the vessel, said lining being derived from the solution of liquid reducing agent halide having metal product solute dissolved therein, freezing the metal product, and separating the reducing agent halide from the metal product.

2. The method of collecting and separating the refractory metal component from the reaction products formed during the reduction of a halide of a refractory metal chosen from the group consisting of titanium, zirconium, vanadium, hafnium, silicon, thorium, chromium and columbium with a reducing agent chosen from the group consisting of the alkali and alkaline earth metals comprising introducing into a vessel liquid metal product and liquid reducing agent halide containing a portion of said liquid metal product in solution, chilling the walls of the vessel, contacting the solution of liquid reducing agent halide having metal product dissolved therein to the chilled walls of the vessel, thereby producing and maintaining a lining of metal product sponge on the walls of the vessel, said lining being derived from the solution of liquid reducing agent halide having metal product solute dissolved therein, gravitationally separating liquid reducing agent halide from liquid metal product, maintaining the temperature of the gravitationally separating liquid reducing agent halide and liquid metal product at least as high as the melting point of the metal product, and freezing the gravitationally separated metal product within the vessel.

3. The method of collecting and separating the refractory metal component from the reaction products formed during the reduction of a halide of a refractory metal chosen from the group consisting of titanium, zirconium, vanadium, hafnium, silicon, thorium, chromium and columbium with a reducing agent chosen from the group consisting of the alkali and alkaline earth metals comprising introducing into a vessel liquid metal product and liquid reducing agent halide containing a portion of said liquid metal product in solution, said metal product being decreasingly soluble in the reducing agent halide as the temperature of the reducing agent halide decreases, chilling the walls of the vessel, contacting the solution of reducing agent halide having metal product solute dissolved therein to the exposed, chilled walls of the vessel, thereby producing and maintaining a lining of metal product sponge on the walls of the vessel, said lining being derived from the collecting solution of reducing agent halide having metal product dissolved therein, gravitationally separating the liquid reducing agent halide and liquid metal product into an overlying pool of liquid reducing agent halide and an underlying pool of liquid metal product, maintaining the temperature of the separating liquid reducing agent halide and liquid metal product at least as high as the melting point of the metal product, decanting the supernatant separated liquid reducing agent halide from the vessel into a collection chamber, chilling the walls of the collection chamber, producing and maintaining a lining of metal product sponge on the chilled walls of the collection chamber, said lining on the walls of the collection chamber being derived from the decanted solution of reducing agent halide having metal product dissolved therein collecting in the collection chamber, freezing the metal product pool in the vessel from the bottom upwardly, freezing the decanted reducing agent halide in the collection chamber, and withdrawing downwardly the frozen metal product from the bottom of the vessel.

4. The method of collecting and separating the refractory metal component from the reaction products formed during the reduction of a halide of a refractory metal chosen from the group consisting of titanium, zirconium, vanadium, hafnium, silicon, thorium, chromium and columbium with a reducing agent chosen from the group consisting of the alkali and akaline earth metals comprising the procedure in accordance with claim 1 and freezing the metal product in the vessel from the bottom upwardly, withdrawing downwardly the frozen metal product and the metal product sponge lining, contacting the solution of reducing agent halide with metal product solute dissolved therein to the chilled walls of the vessel where the metal product sponge lining has been withdrawn downwardly, thereby producing and maintaining a new metal product sponge lining on the walls of the vessel to replace that portion of the lining withdrawn downwardly, said new lining being derived from the collecting solution of reducing agent halide having metal product dissolved therein.

5. The method of collecting and separating the refractory metal component from the reaction products formed during the reduction of a halide of a refractory metal chosen from the group consisting of titanium, zirconium, vanadium, hafnium, silicon, thorium, chromium and columbium with a reducing agent chosen from the group consisting of the alkali and alkaline earth metals comprising introducing into a vessel liquid metal product and liquid reducing agent halide containing a portion of said liquid metal product in solution, chilling the walls of the vessel, contacting the solution of liquid reducing agent halide having metal product solute dissolved therein to the chilled walls of the vessel, thereby producing and maintaining a metal product sponge lining on the chilled walls of the vessel, said lining being derived from the solution of liquid reducing agent halide having metal product solute dissolved therein, producing and maintaining a pool of liquid reducing agent halide in the vessel, maintaining the temperature of the pool of liquid reducing agent halide above the melting point of the reducing agent halide but below the melting point of the refractory metal, introducing the liquid metal product into the pool of reducing agent halide in discrete drops, and freezing the metal product drops into discrete solid, metal product shot as they descend through the pool of reducing agent halide.

6. The method of collecting and separating the refractory metal component from the reaction products formed during the reduction of a halide of a refractory metal chosen from the group consisting of titanium, zirconium, vanadium, hafnium, silicon, thorium, chromium and columbium with a reducing agent chosen from the group consisting of the alkali and alkaline earth metals comprising the procedure in accordance with claim 1 and freezing the metal product within the vessel into discrete shot.

References Cited in the file of this patent

UNITED STATES PATENTS

| 2,782,116 | Spedding et al. | Feb. 19, 1957 |
| 2,828,199 | Findlay | Mar. 25, 1958 |
| 2,941,867 | Maurer | June 21, 1960 |

FOREIGN PATENTS

| 736,852 | Great Britain | Sept. 14, 1955 |